(12) United States Patent
Thorpe et al.

(10) Patent No.: US 10,415,953 B2
(45) Date of Patent: *Sep. 17, 2019

(54) LENGTH METROLOGY APPARATUS AND METHODS FOR SUPPRESSING PHASE NOISE-INDUCED DISTANCE MEASUREMENT ERRORS

(71) Applicant: Bridger Photonics, Inc., Bozeman, MT (US)

(72) Inventors: Michael Thorpe, Bozeman, MT (US); Aaron Kreitinger, Bozeman, MT (US); Randy Reibel, Bozeman, MT (US)

(73) Assignee: Bridger Photonics, Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/680,076

(22) Filed: Aug. 17, 2017

(65) Prior Publication Data

US 2017/0343333 A1 Nov. 30, 2017

Related U.S. Application Data

(63) Continuation of application No. 14/926,750, filed on Oct. 29, 2015, now Pat. No. 9,784,560.

(60) Provisional application No. 62/181,820, filed on Jun. 19, 2015, provisional application No. 62/069,917, filed on Oct. 29, 2014.

(51) Int. Cl.
*G01B 9/02* (2006.01)
*G01B 11/02* (2006.01)
(Continued)

(52) U.S. Cl.
CPC ..... *G01B 9/02007* (2013.01); *G01B 9/02004* (2013.01); *G01B 9/02075* (2013.01);
(Continued)

(58) Field of Classification Search
CPC ............. G01B 11/026; G01B 9/02007; G01B 9/0207; G01B 9/0271
See application file for complete search history.

(56) References Cited

U.S. PATENT DOCUMENTS 4,593,368 A 6/1986 Fridge et al.
4,830,486 A 5/1989 Goodwin
(Continued)

FOREIGN PATENT DOCUMENTS

WO 2010127151 A2 11/2010
WO 2014088650 A1 6/2014

OTHER PUBLICATIONS

International Search Report and Written Opinion received for PCT/US2015/058051 dated Jan. 19, 2016.
(Continued)

*Primary Examiner* — Jonathan M Hansen
(74) *Attorney, Agent, or Firm* — Dorsey & Whitney LLP

(57) ABSTRACT

Length metrology apparatuses and methods are disclosed for measuring both specular and non-specular surfaces with high accuracy and precision, and with suppressed phase induced distance errors. In one embodiment, a system includes a laser source exhibiting a first and second laser outputs with optical frequencies that are modulated linearly over large frequency ranges. The system further includes calibration and signal processing portions configured to determine a calibrated distance to at least one sample.

21 Claims, 10 Drawing Sheets

(51) Int. Cl.
H04B 10/071 (2013.01)
H04B 10/079 (2013.01)
H04B 10/516 (2013.01)

(52) U.S. Cl.
CPC ......... G01B 11/026 (2013.01); H04B 10/071 (2013.01); H04B 10/07953 (2013.01); H04B 10/5165 (2013.01)

(56) References Cited

U.S. PATENT DOCUMENTS

| | | | |
|---|---|---|---|
| 5,367,399 | A | 11/1994 | Kramer |
| 5,371,587 | A | 12/1994 | De Groot et al. |
| 5,534,993 | A | 7/1996 | Ball et al. |
| 5,768,001 | A | 6/1998 | Kelley et al. |
| 5,859,694 | A | 1/1999 | Galtier et al. |
| 6,822,742 | B1 | 11/2004 | Kalayeh et al. |
| 7,215,413 | B2 | 5/2007 | Soreide et al. |
| 7,292,347 | B2 | 11/2007 | Tobiason et al. |
| 7,511,824 | B2* | 3/2009 | Sebastian ................. G01C 3/08 356/486 |
| 7,742,152 | B2 | 6/2010 | Hui et al. |
| 7,920,272 | B2 | 4/2011 | Sebastian et al. |
| 8,582,085 | B2 | 11/2013 | Sebastian et al. |
| 9,030,670 | B2 | 5/2015 | Warden et al. |
| 9,559,486 | B2 | 1/2017 | Roos et al. |
| 9,784,560 | B2 | 10/2017 | Thorpe et al. |
| 9,864,060 | B2 | 1/2018 | Sebastian et al. |
| 9,970,756 | B2 | 5/2018 | Kreitinger et al. |
| 2003/0043437 | A1 | 3/2003 | Stough et al. |
| 2004/0105087 | A1 | 6/2004 | Gogolla et al. |
| 2005/0094149 | A1 | 5/2005 | Cannon |
| 2006/0050270 | A1 | 3/2006 | Elman |
| 2006/0162428 | A1 | 7/2006 | Hu et al. |
| 2008/0018881 | A1 | 1/2008 | Hui et al. |
| 2008/0018901 | A1 | 1/2008 | Groot |
| 2009/0046295 | A1 | 2/2009 | Kemp et al. |
| 2009/0153872 | A1 | 6/2009 | Sebastian et al. |
| 2010/0091278 | A1 | 4/2010 | Liu et al. |
| 2010/0131207 | A1 | 5/2010 | Lippert et al. |
| 2011/0164783 | A1 | 7/2011 | Hays et al. |
| 2011/0205523 | A1* | 8/2011 | Rezk .................... G01S 17/325 356/5.09 |
| 2011/0213554 | A1 | 9/2011 | Archibald et al. |
| 2011/0273699 | A1 | 11/2011 | Sebastian et al. |
| 2011/0292403 | A1 | 12/2011 | Jensen et al. |
| 2012/0106579 | A1 | 5/2012 | Roos et al. |
| 2013/0104661 | A1 | 5/2013 | Klotz et al. |
| 2014/0036252 | A1 | 2/2014 | Amzajerdian et al. |
| 2014/0139818 | A1 | 5/2014 | Sebastian et al. |
| 2014/0204363 | A1 | 7/2014 | Slotwinski et al. |
| 2015/0019160 | A1 | 1/2015 | Thurner et al. |
| 2015/0185313 | A1 | 7/2015 | Zhu |
| 2016/0123718 | A1 | 5/2016 | Roos et al. |
| 2016/0123720 | A1 | 5/2016 | Thorpe et al. |
| 2016/0202225 | A1 | 7/2016 | Feng et al. |
| 2016/0259038 | A1 | 9/2016 | Retterath et al. |
| 2017/0097274 | A1 | 4/2017 | Thorpe et al. |
| 2017/0097302 | A1 | 4/2017 | Kreitinger et al. |
| 2017/0115218 | A1 | 4/2017 | Huang et al. |
| 2017/0191898 | A1 | 7/2017 | Rella et al. |
| 2018/0188369 | A1 | 7/2018 | Sebastian et al. |
| 2018/0216932 | A1 | 8/2018 | Kreitinger et al. |

OTHER PUBLICATIONS

Amann, et al., "Laser ranging: a critical review of usual techniques for distance measurement," Optical Engineering, vol. 40(1) pp. 10-19 (Jan. 2001).
Barber, et al., "Accuracy of Active Chirp Linearization for Broadband Frequency Modulated Continuous Wave Ladar," Applied Optics, vol. 49, No. 2, pp. 213-219 (Jan. 2010).
Barker, "Performance enhancement of intensity-modulated laser rangefinders on natural surfaces", SPIE vol. 5606, pp. 161-168 (Dec. 2004).
Baumann, et al., "Speckle Phase Noise in Coherent Laser Ranging: Fundamental Precision Limitations," Optical Letters, vol. 39, Issue 16, pp. 4776-4779 (Aug. 2014).
Boashash, "Estimating and Interpreting the Instantaneous Frequency of a Signal—Part 2: Algorithms and Applications", Proceedings of the IEEE, vol. 80, No. 4, pp. 540-568 (Apr. 1992).
Bomse, et al., "Frequency modulation and wavelength modulation spectroscopies: comparison of experimental methods using a lead-salt diode laser", Appl. Opt., 31, pp. 718-731 (Feb. 1992).
Choma, et al., "Sensitivity Advantage of Swept Source and Fourier Domain Optical Coherence Tomography," Optical Express, Vol.11, No. 18, 2183 (Sep. 2003).
Ciurylo, ,"Shapes of pressure- and Doppler-broadened spectral lines in the core and near wings", Physical Review A, vol. 58 No. 2, pp. 1029-1039 (Aug. 1998).
Dharamsi, "A theory of modulation spectroscopy with applications of higher harmonic detection", J. Phys. D: Appl. Phys 29, pp. 540-549 (Jun. 1995;1996) (Retrieved Jan. 16, 2017).
Fehr, et al., "Compact Covariance Descriptors in 3D Point Clouds for Object Recognition", 2012 IEEE International Conference on Robotics and Automation, pp. 1793-1798, (May 2012).
Fujima, et al., "High-resolution distance meter using optical intensity modulation at 28 GHz", Meas. Sci. Technol. 9, pp. 1049-1052 (May 1998).
Gilbert, et al., "Hydrogen Cyanide H13C14N Absorption Reference for 1530 nm to 1565 nm Wavelength Calibration—SRM 2519a", NIST Special Publication 260-137 2005 ED, 29 pages, (Aug. 2005).
Iseki, et al., "A Compact Remote Methane Sensor using a Tunable Diode Laser", Meas. Sci. Technol., 11, 594, pp. 217-220 (Jun. 2000).
Jia-Nian, et al., "Etalon effects analysis in tunable diode laser absorption spectroscopy gas concentration detection system based on wavelength modulation spectroscopy", IEEE SOPO, pp. 1-5 (Jul. 2010).
Johnson, et al., "Using Spin-Images for Efficient Object Recognition in Cluttered 3D Scenes", IEEE Transactions on Pattern Analysis and Machine Intelligence, vol. 21, No. 5, 37 pages (Published May 1999).
Karmacharya, et al., "Knowledge guided object detection and indentification in 3D point clouds", SPIE 9528, 952804-952804-13 (Jun. 2015).
Masiyano, et al., "Use of diffuse reflections in tunable diode laser absorption spectroscopy: implications of laser speckle for gas absorption measurements", Appl. Phys. B 90, pp. 279-288 (Feb. 2008).
Ngo, et al., "An isolated line-shape model to go beyond the Voigt profile in spectroscopic databases and radiative transfer codes", Journal of Quantitative Spectroscopy and Radiative Transfer, 129, pp. 89-100 (Nov. 2013).
Olsovsky, et al., "Chromatic Confocal Microscopy for Multi-depth Imaging of Epithelial Tissue," Biomedical Optics Express, vol. 4, No. 5, pp. 732-740 (May 2013).
Paffenholz, "Direct geo-referencing of 3D point clouds with 3D positioning sensors", (Doctoral Thesis), Leibniz Universität Hannover, 138 pages (Sep. 2012).
Polyanksy, et al., "High-Accuracy CO2 Line Intensities Determined from Theory and Experiment", Physical Review Letters, 114, 5 pages (Jun. 2015).
Rao, "Information and the accuracy attainable in the estimatin of statistical parameters", Bull. Calcutta Math. Soc., 37,pp. 81-89 (1945, reprinted 1992) (Retrieved Jan. 10, 2017).
Riris, et al., "Airborne measurements of atmospheric methane column abundance using a pulsed integrated-path differential absorption lidar", Applied Optics, vol. 51, No. 34, pp. 8296-8305 (Dec. 2012).
Roos, et al., "Ultrabroadband optical chirp linearization for precision metrology application", Optics Letters, vol. 34 No. 23, pp. 3692-3694 (Dec. 2009).
Rothman, et al., "The HITRAN 2008 molecular spectroscopic database", Journal of Quantitative Spectroscopy & Radiative Transfer, 110, pp. 533-572 (Jul. 2009).

(56) References Cited

OTHER PUBLICATIONS

Rusu, et al., "Fast Point Feature Histograms (FPFH) for 3D Registration", IEEE Int. Conf. Robot., pp. 3212-3217 (May 2009).
Sandsten, et al., "Volume flow calculations on gas leaks imaged with infrared gas-correlation", Optics Express, vol. 20, No. 18, pp. 20318-20329 (Aug. 2012).
Sheen, "Frequency Modulation Spectroscopy Modeling for Remote Chemical Detection", PNNL 13324, 51 pages (Sep. 2000).
Silver, "Frequency-modulation spectroscopy for trace species detection: theory and comparison among experimental methods", Appl. Opt., vol. 31 No. 6, pp. 707-717 (Feb. 1992).
Sirat, et al., "Conoscopic Holography," Optics Letters, vol. 10, No. 1 (Jan. 1985).
Stone, et al., "Performance Analysis of Next-Generation LADAR for Manufacturing, Construction, and Mobility," NISTIR 7117 (May 2004).
Twynstra, et al., "Laser-absorption tomography beam arrangement optimization using resolution matrices", Applied Optics, vol. 51, No. 29, pp. 7059-7068 (Oct. 2012).
Xi, et al., "Generic real-time uniorm K-space sampling method for high-speed swept-Source optical cohernece tomography", Optics Express, vol. 18, No. 9, pp. 9511-9517 (Apr. 2010).
Zakrevskyy, et al., "Quantitative calibration- and reference-free wavelength modulation spectroscopy", Infrared Physics & Technology, 55, pp. 183-190 (Mar. 2012).
Zhao, et al.,"Calibration-free wavelength-modulation spectroscopy based on a swiftly determined wavelength-modulation frequency response function of a DFB laser", Opt. Exp., vol. 24 No. 2, pp. 1723-1733 (Jan. 2016).
Lu, et al., "Differential wavelength-scanning heterodyne interferometer for measuring large step height", Applied Optics, vol. 41, No. 28, Oct. 1, 2002.
U.S. Appl. No. 15/936,247, titled "High-Sensitivity Gas-Mapping 3D Imager and Method of Operation", filed Mar. 26, 2018, pp. all.
Emran, Bara J. et al., "Low-Altitude Aerial Methane Concentration Mapping", School of Engineering, The University of British Columbia, Aug. 10, 2017, pp. 1-12.

\* cited by examiner $w_0$ = Gaussian Beam Waist

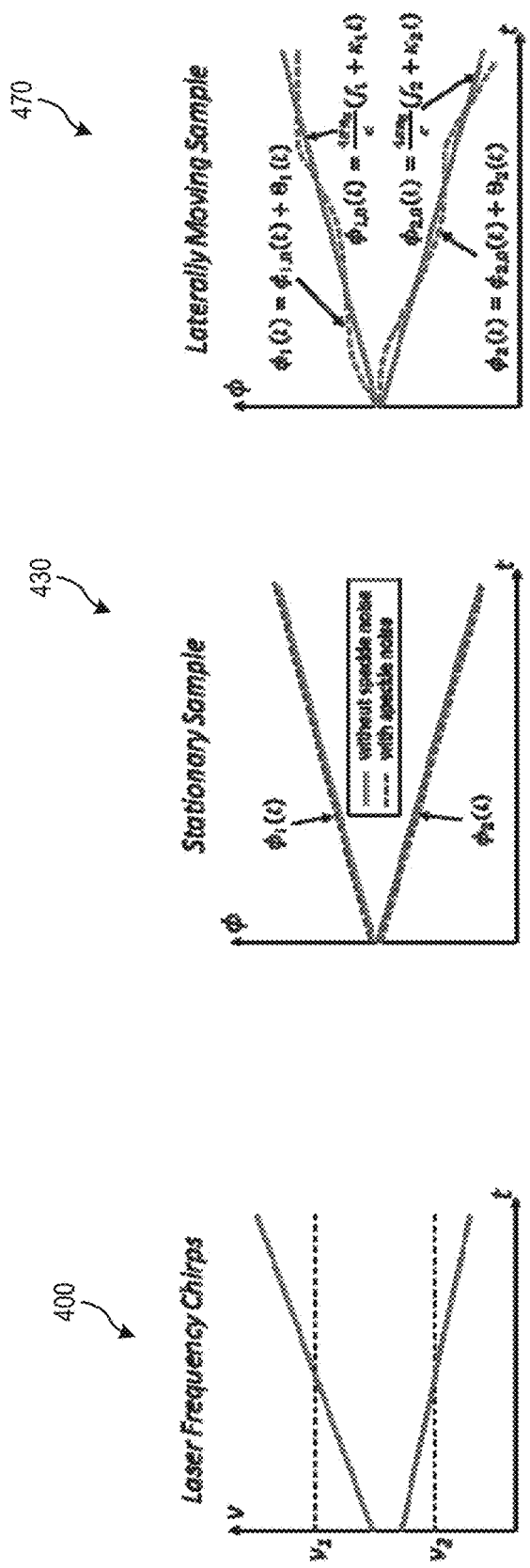

LENGTH METROLOGY APPARATUS AND METHODS FOR SUPPRESSING PHASE NOISE-INDUCED DISTANCE MEASUREMENT ERRORS

CROSS REFERENCE TO RELATED APPLICATION(S)

This application is a continuation of U.S. patent application Ser. No. 14/926,750, filed Oct. 29, 2015 and issued as U.S. Pat. No. 9,784,560 on Oct. 10, 2017, which claims the filing benefit of U.S. Provisional Application No. 62/069,917, filed Oct. 29, 2014, and U.S. Provisional Application No. 62/181,820, filed Jun. 19, 2015. These applications, and issued patent, are incorporated by reference herein in their entirety and for all purposes.

FIELD OF THE INVENTION

The present invention generally relates to the field of optical distance and length metrology and specifically to the field of coherent length metrology and laser radar.

BACKGROUND

Various techniques for precisely measuring distance to objects or thicknesses of objects by optical means are known. These techniques include laser triangulation, conoscopic holography, low-coherence interferometry, chromatic confocal point sensing, frequency modulated continuous-wave (FMCW) laser radar, swept-frequency optical coherence tomography, and phase modulation range finding. (See, e.g., M.-D. Amann, et al., "Laser ranging: a critical review of usual techniques for distance measurement," Opt. Eng. 40(1) 10-19 (January 2001), F. Blateyron, Chromatic Confocal Microscopy, in Optical Measurement of Surface Topography, (Springer Berlin Heidelberg) pp 71-106 (2011), C. Olsovsky, et al., "Chromatic confocal microscopy for multi-depth imaging of epithelial tissue," Biomed Opt Express. May 1, 2013; 4(5): 732-740, G. Y. Sirat et al., "Conoscopic holography," Opt. Lett. 10, (1985), W. C. Stone, et al., "Performance Analysis of Next-Generation LADAR for Manufacturing, Construction, and Mobility," NISTIR 7117, May 2004, and M. A. Choma, "Sensitivity advantage of swept source and Fourier domain optical coherence tomography," Opt. Exp. 11 (18), 2183 (2003).) These techniques offer varying levels and combinations of measurement ranges, precisions, and resolutions.

Optical phase-sensitive detection techniques (also sometimes referred to as "coherent detection techniques"), such as low-coherence interferometry, optical coherence tomography and laser radar, can offer extremely high resolution, but face unique challenges in measuring diffusely scattering surfaces due to speckle, the far-field interference pattern arising from the multiple scattering centers of a diffuse reflector. For relative lateral motion (i.e. motion perpendicular to the laser beam propagation direction, and thus not a Doppler shift) between the laser beam and a rough surface (with roughness less than the system resolution), researchers at the National Institute of Standards and Technology (NIST) recently showed that speckle-induced phase variations place a "strong limit" on the achievable range uncertainty and precision using the FMCW laser radar technique. (See, E. Baumann, et. al, "Speckle phase noise in coherent laser ranging: fundamental precision limitations," Opt. Lett., Vol. 39, Issue 16, pp. 4776-4779 (2014).) This reference ("Baumann") is incorporated herein by reference in its entirety. The researchers showed that speckle noise resulting from surface roughness of a laterally moving surface (or laser beam) leads to a non-Gaussian range distribution with measurement errors that can dramatically exceed both the Cramer Rao lower bound and the surface roughness amplitude. Motion of the beam location on the sample surface degrades measurements significantly compared to the case where each successive point is measured statically, even to the point where outliers during lateral motion approach the system range resolution (given by c/2B, where c is the speed of light and B is the information bandwidth). As a result, the use of FMCW laser radar for high-precision surface imaging at a distance, for instance, is limited to either static point-by-point measurements, spatial averaging, or they must endure degraded precision when the beam location on the sample surface is in motion. Unfortunately, such lateral motion is needed for a variety of applications including non-contact, in-situ industrial metrology and impression-based forensics evidence. Baumann identifies the speckle noise problem with no solution. Solutions to the surface roughness speckle noise problem are therefore needed.

SUMMARY

A method is provided for measuring distance with improved measurement accuracy or precision, comprising: producing a first laser output; producing a second laser output; modulating an optical frequency of at least one of the first laser output or the second laser output; producing a combined beam, which is the combination of the first and second laser outputs; directing the combined beam through a plurality of optical paths, at least one of the optical paths including a sample, and the plurality of optical paths being configured to direct at least part of the combined beam onto at least one optical detector to produce an interference signal; distinguishing the interference signal contributions that are due to the first laser output from the interference signal contributions that are due to the second laser output; and processing first interference signal contributions that are due to the first laser output with second interference contributions that are due to the second laser output to lessen distance or displacement measurement errors that result from surface roughness or from dispersion properties of the sample or from dispersion properties of the optical path that includes the sample.

The first interference signal contributions may be distinguished from the second interference signal contributions by substantially optically separating the first and second laser outputs onto a corresponding first and second detector.

The first interference signal contributions may be distinguished from the second interference signal contributions by electrical bandpass filtering or digital bandpass filtering.

At least one of the first or second optical frequency modulations may be a carrier optical frequency chirp. Alternatively, at least one of the first or second optical frequency modulations may be an optical sideband chirp;

A carrier optical frequency chirp may be additionally modulated to produce at least one optical sideband on the optical carrier.

The processing step may include calculating a first signal phase and a second signal phase as functions of time corresponding to a received first interference signal and a received second interference signal, manipulating the first interference signal phase and the second interference signal phase as a function of time to suppress common-mode distance measurement errors that result from surface roughness or dispersion properties of the sample or of the optical path that includes the sample, thereby producing a corrected signal phase; and determining the distance to the sample with reduced distance errors based on the corrected signal phase.

The manipulating of the first and second interference signal phases may involve determining the sum or difference of the first interference signal phase and the second interference signal phase.

The determination of the first signal phase and second signal phases may be performed using Hilbert transforms.

The method may further comprise performing corrections to at least one of the first and second signal phases based on the wavelength and chirp rate of the first and second laser outputs to produce a corrected first and second signal phase.

A system is provided for separating up-chirp and down-chirp components of a sideband-modulated FMCW system, comprising: a physical device providing a laser output; a modulator imparting chirped sidebands on a carrier optical frequency of the laser output, the chirped sidebands being separated in frequency; a beam splitter configured to split the modulated laser output into a first local oscillator (LO) portion and a second transmitted portion (TX); a frequency shifter configured to shift either or both of the LO and the TX in optical frequency in order to allow separation of the contributions of the chirped sidebands; a combiner configured to combine the LO and a receiver portion (RX); a detector configured to detect the interference signal resulting from the LO and the RX; and a processor configured to distinguish the interference signal contributions that are due to different chirped sidebands and to use the separated interference signal contributions to determine a target range.

A method is provided of processing distance measurements to improve measurement accuracy or precision, comprising: producing a laser output; modulating the optical frequency of the laser output or modulating a sideband of the optical frequency of the laser output to produce a modulated laser output; directing the modulated laser output through a plurality of optical paths at least one of the optical paths including a sample, the plurality of optical paths being configured to direct at least part of the modulated laser output onto at least one optical detector to produce an interference signal; computing deviations of the interference signal amplitude, frequency, or phase from established amplitude, frequency, or phase functions or values in either the frequency domain or the time domain; identifying, weighting, or disregarding distance measurements based one or more metrics that quantify the computed deviations from the established amplitude, frequency, or phase functions or values; and utilizing the identification, weighting, or disregarding of measurements to improve the accuracy of one or more distance measurements to the sample.

The range peak shape in the frequency domain may be compared to an exemplary range peak shape. The root-mean-square deviations of the signal phase as a function of time may be compared to an established value. The signal-to-noise ratio may be compared to an established signal-to-noise ratio value.

A method is provided of processing distance measurements to improve measurement accuracy or precision, comprising: producing a first laser output; producing a second laser output; modulating at least one of a first optical frequency of the first laser output, and a second optical frequency of the second laser output; producing a combined beam which is the combination of the first and second laser outputs; directing the combined beam through a plurality of optical paths, at least one of the optical paths including a sample, the plurality of optical paths being configured to direct at least part of the combined beam onto at least one optical detector to produce an interference signal; distinguishing the interference signal contributions that are due to the first laser output from the contributions that are due to the second laser output wherein the interference signals result from laser outputs for which dispersion in the sample or the optical path to the sample are substantially the same; and processing the first and second interference signals to determine the distance to the sample with reduced dispersion-induced distance errors.

At least one of the laser outputs may be modulated with a linear chirp;

The processing may include calculating a first and a second signal phase as a function of time corresponding to the received first and second interference signal; and calculating the sum or difference of the first and the second signal phases as a function of time to substantially suppress common-mode measurement errors and to produce a corrected signal phase.

The first interference signal and the second interference signal may result from the same laser output, but at different times.

The first interference signal may result from a first laser output and the second interference signal may result from a second laser output.

DESCRIPTION OF THE DRAWINGS

FIG. 4A is a plot showing frequency versus time for first and second lasers according to disclosed embodiments;

FIG. 4B is a plot showing phase versus time for a stationary sample. In this case the phase with and without speckle noise are nearly identical according to disclosed embodiments;

FIG. 4C is a plot showing phase versus time of the measured signals for a sample with lateral motion. $\varphi 1,0$ and $\varphi 2,0$ represent the phase without speckle-induced phase noise, while $\varphi 1$ and $\varphi 2$ represent the measured phase with speckle-induced noise according to disclosed embodiments;

DETAILED DESCRIPTION

The invention described herein teaches how multiple optical phase-sensitive measurements can be made of a surface and used to significantly suppress phase noise-induced distance measurement errors during lateral motion, such as those due to speckle. In each embodiment described, a difference in phase-sensitivity to the sample surface distance between the multiple measurements is used to suppress the phase noise-induced errors.

Figure 1A:
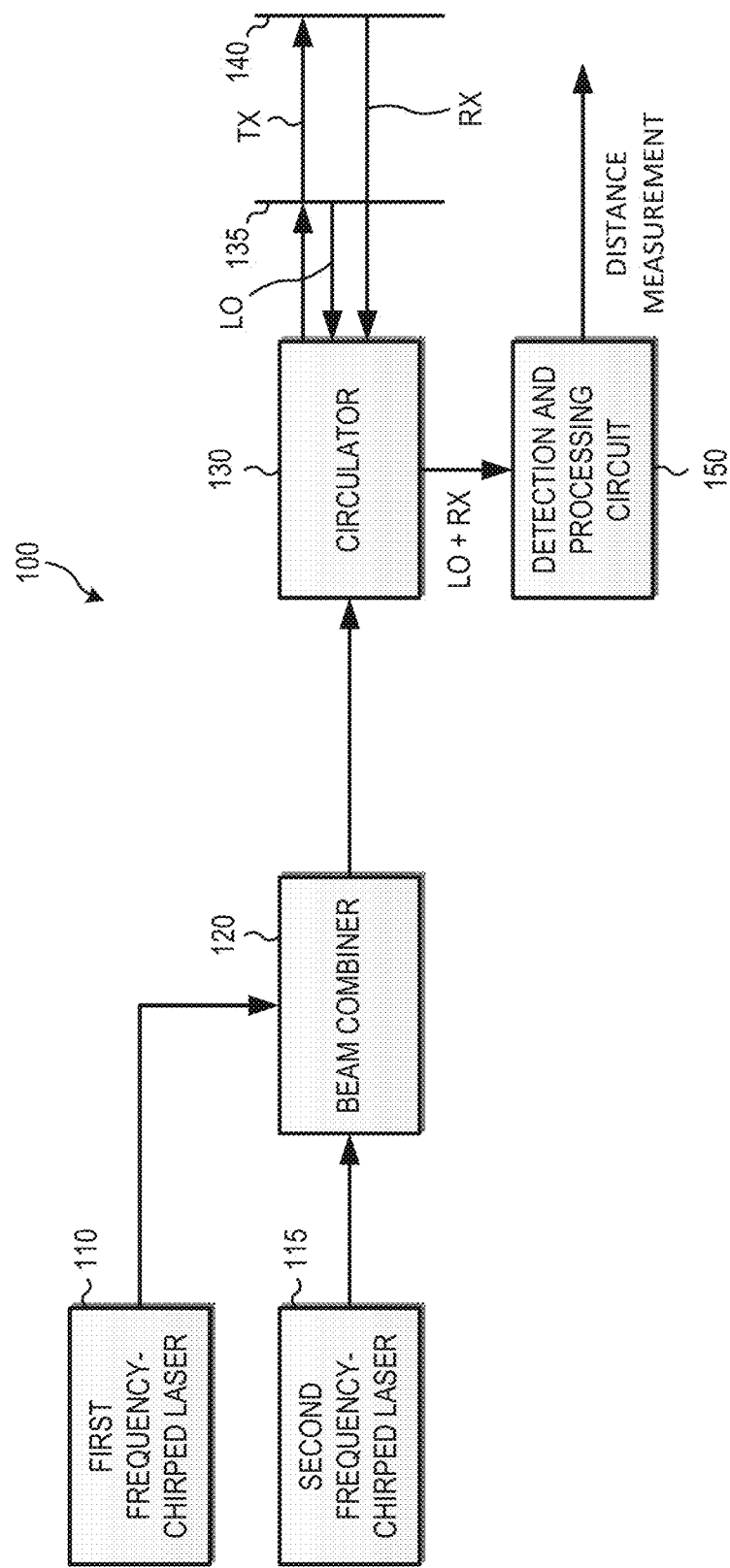
FIG. 1A is a diagram 100 showing some principle elements of a swept frequency metrology system according to disclosed embodiments.

A measurement may be defined as the time-varying phase of the interference between light received from a reference surface and a sample surface for a single laser. It is understood that additional surfaces and lasers may also be considered. A depiction of a system that may perform two simultaneous measurements using two separate lasers is shown in FIG. 1A. Below is a mathematical description of the signal for a single measurement that may follow the formalism provided in Z. W. Barber, et al., "Accuracy of active chirp linearization for broadband frequency modulated continuous wave ladar," Appl. Opt., 49, 213 (2010). The light received from the reference surface will be referred to as the local oscillator (LO). The time-varying optical frequency for LO electric field can be represented in the form $$E_{LO}(t,z=0) = E_0 e^{-i(\omega_0 t + 1/2 \alpha t^2)}, \quad (1)$$

where $\omega_0$ is the angular optical frequency at the beginning of the chirp, and $\alpha$ is the angular chirp rate. Propagation of the LO field to the sample surface can be treated by performing a Fourier transform to the frequency domain.

$$E(\omega, z=0) = \frac{E_0}{\sqrt{2\pi}} \int_{-\infty}^{\infty} e^{-i(\omega_0 t + \frac{1}{2}\alpha t^2)} e^{i\omega t} dt = E_0 \frac{1-i}{\sqrt{2\alpha}} e^{i\frac{(\omega-\omega_0)^2}{2\alpha}} \quad (2)$$

The LO field is then propagated to the sample surface and back to the reference surface, where it interferes with the LO field, by applying a Taylor expanded form of the propagator $e^{i\beta z}$.

$$E_{Rx}(\omega, z=2R) = E(\omega, z=0) e^{i2\beta_0 R} e^{i2\beta_1 (\omega-\omega_0) R} e^{i2\beta_2 (\omega-\omega_0)^2 R} \quad (3)$$

Here R is the distance to the sample and $$\beta_0 = \frac{\omega_0 n}{c}, \beta_1 = \frac{\partial \beta}{\partial \omega}\bigg|_{\omega=\omega_0} = \frac{1}{v_g}, \text{ and } \beta_2 = \frac{\partial^2 \beta}{\partial \omega^2}\bigg|_{\omega=\omega_0}.$$

Also, c is the speed of light, n is the refractive index of the medium between the reference and sample surfaces, and $v_g$ is the group velocity in the medium. The time-domain description of the field reflected from sample surface, back to the LO surface, is given by $$E_{Rx}(t, z=2R) = E_0 \sqrt{\frac{\alpha'}{\alpha}} e^{-i(\omega_0(t-2\frac{n}{c}R) + \frac{1}{2}\alpha'(t-2\beta_1 R)^2)}, \quad (4)$$

where $$\alpha' = \frac{\alpha}{1+2R\alpha\beta_2}.$$

The interference between the fields $E_{LO}$ and $E_{Rx}$ comprises a single distance measurement, and takes the form $$S(t) \sim E_{LO}(t, z=0) E_{Rx}(t, z=2R) \sim \quad (5)$$

$$e^{-i(2\omega_0 \frac{n}{c} R - \frac{1}{2}\alpha'(2\beta_1 R)^2 + 2R\alpha'\beta_1 t + \frac{1}{2}(\alpha-\alpha')t^2)}.$$

For many cases, terms involving $\beta_2$ and $\beta_1^2$ can be neglected, and the signal can be adequately approximated by $$S(t) \sim e^{-i(2\omega_0 \frac{n}{c} R + 2R\alpha\beta_1 t)}. \quad (6)$$

However, we have included terms to second order in equation (5) to aid the discussion in later sections of this document.

FMCW Carrier Measurements for Compensating Phase Noise-induced Errors

FIG. 1A is a diagram showing some principle elements of a swept frequency metrology system 100 according to disclosed embodiments. In FIG. 1A, black arrows indicate optical paths.

As shown in FIG. 1A, the swept frequency metrology system 100 includes a first frequency-chirped laser 110, a second frequency-chirped laser 115, a beam combiner 120, a circulator 130, a reference surface 135, a first sample surface 140, and a detection and processing unit 150.

The first frequency-chirped laser 110 and the second frequency-chirped laser 115 each output light of an optical frequency that changes substantially linearly (chirps) in time over a given chirp duration.

The beam combiner 120 is configured to receive and combine at least part of the first and second laser outputs into a combined laser output. In some embodiments, a single laser may produce an output with both frequency-chirped components, in which case the beam combination occurs internal to the laser.

The combined laser output from the beam combiner 120 is then directed through the circulator 130 and a plurality of optical paths configured to direct at least part of the combined beam onto an optical detector to produce an interference signal.

In FIG. 1A, an optical path may include a transmitted portion denoted Tx. An optical path may include reflection from the reference surface 135, the reflected portion from the reference surface 135 being denoted LO. An optical path may include reflection from the first sample surface 140, the reflected portion from the first sample surface 140 being denoted Rx.

A sum of LO and Rx is directed to the detection and processing circuit to determine the distance measurement, as noted below.

Figure 1B:
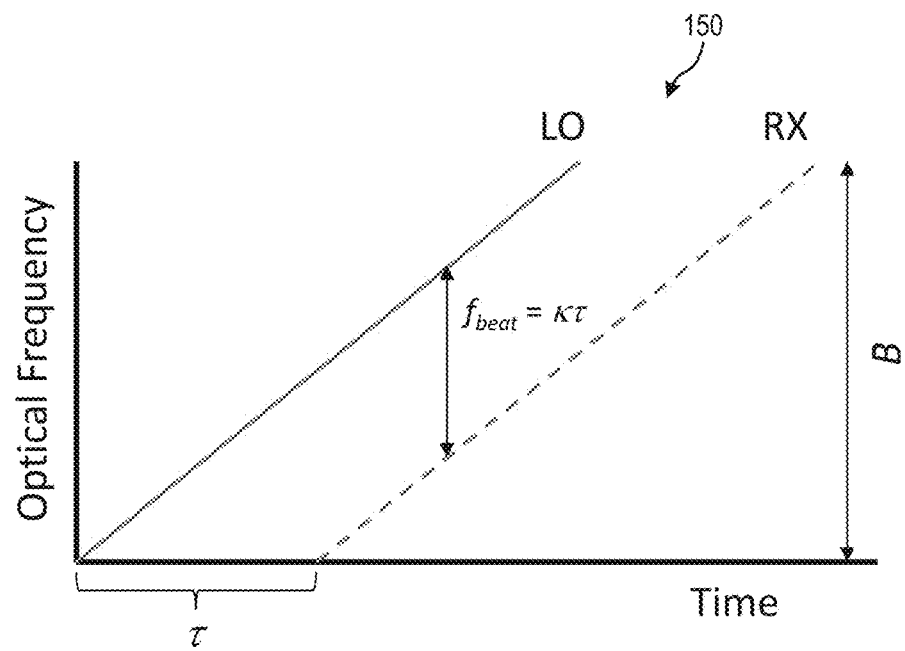
FIG. 1B is a plot showing a linearly swept LO and time-delayed Rx optical frequencies as functions of time according to disclosed embodiments.

FIG. 1B is a plot 150 showing a linearly swept LO and time-delayed Rx optical frequencies as functions of time according to disclosed embodiments.

In some embodiments of the invention, the optical phase-sensitive measurements may be performed using the FMCW ladar technique, and where the optical carrier may be linearly swept, or "chirped", in time. "Performance Analysis of Next-Generation LADAR for Manufacturing, Construction, and Mobility," (cited above) describes the FMCW chirped ladar technique and is incorporated herein by reference in its entirety. A simplified block diagram showing a setup that may be used to compensate speckle noise is shown in FIG. 1A, the laser radiation from two frequency-chirped lasers (one for each optical phase-sensitive measurement) may be combined, directed through an optical circulator, and transmitted (Tx) toward a sample surface. A portion of the combined light (LO) may be reflected from a reference surface, while a second portion (Rx) may be reflected from a sample surface. Interference may occur between light reflected from the reference and sample surfaces. The distance between the reference and sample surfaces may be determined by measuring the frequency of the heterodyne beat generated by the interferometric combination of the Rx and LO resulting from either of the two frequency-swept lasers. As shown in FIG. 1B for a single laser, the beat frequency is given by the equation $f_{beat}=\kappa\tau$, where $\kappa=\alpha/2\pi=B/\tau_{chirp}$ is the chirp rate (B is the chirp bandwidth and $\tau_{chirp}$ is the chirp temporal duration), and $\tau=2Rn_g/c$ is the time delay between the Rx and LO chirp waveforms where $n_g$ is the group index of the measurement path. Solving for R as a function of $f_{beat}$ allows for determination of the range by measuring the heterodyne beat frequency.

Figure 2A:
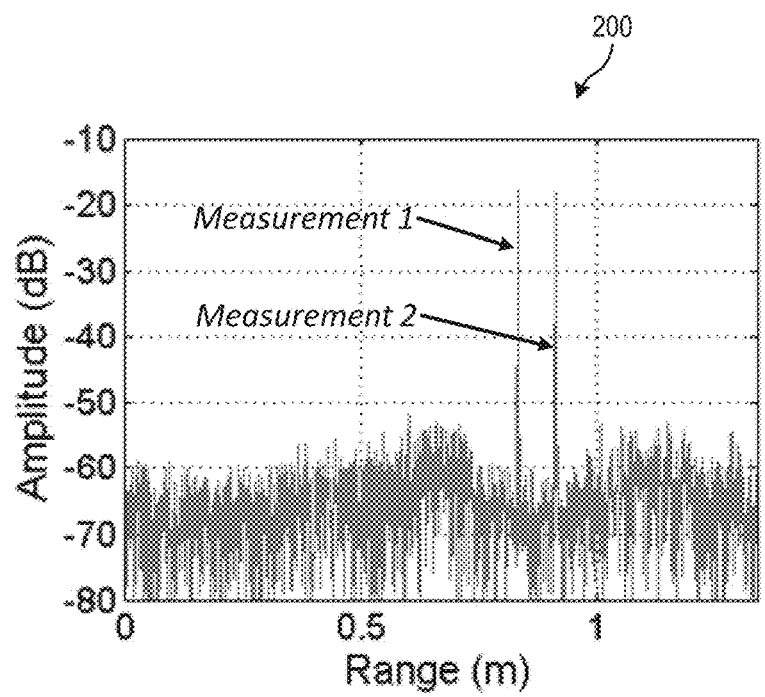
FIG. 2A is a plot of range profile data of a brushed alloy sample showing the peaks from two measurements (an up chirp and a down chirp) from the same target surface according to disclosed embodiments.
Figure 2B:
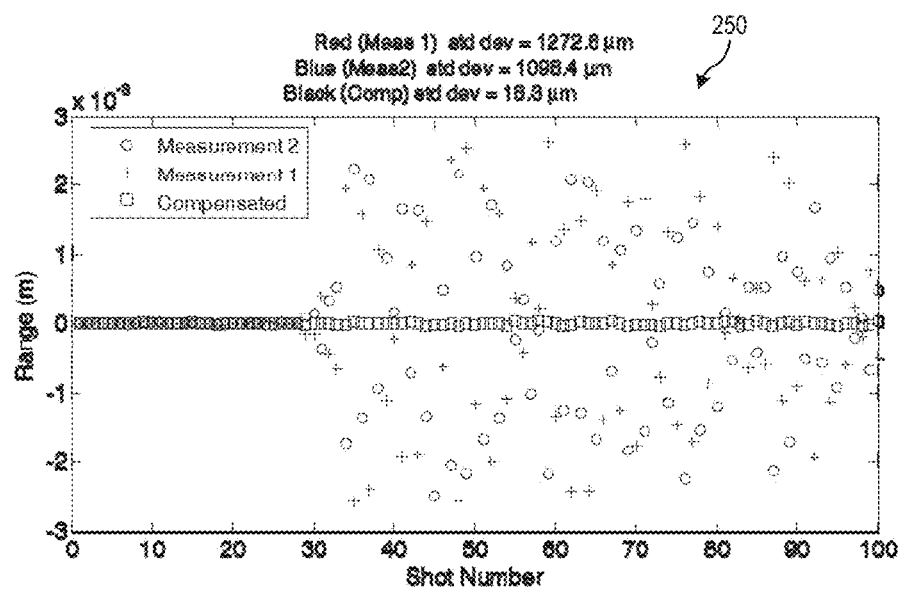
FIG. 2B is a plot of range measurement data of a brushed alloy sample according to disclosed embodiments.

However, when the sample surface is rough, using the measurement of the distance from just one of the frequency-swept lasers may result in distance errors due to speckle. These errors may increase dramatically when the sample surface is translated perpendicularly to the beam propagation direction (e.g. scanning the beam across the surface or vice versa). FIG. 2A shows an FMCW range profile resulting from one surface and from two lasers with different chirp rates. FIG. 2B shows the determination of range from such a range profile for 100 consecutive range measurements of a brushed alloy surface (with sub-resolved surface roughness) using an FMCW chirped ladar system with resolution (full-width at half max) of approximately 1.5 mm. The plus and circle symbols in FIG. 2B represent the distance measurements when only one optical phase-sensitive measurement (data from one laser) is used. In FIG. 2B, the sample remained stationary for the first 28 measurements, and then was laterally translated for the remaining measurements. The nearly two order of magnitude increase in distance measurement errors observed during lateral motion confirm the observations made by the NIST researchers.

FIG. 2A is a plot 200 of range profile data of a brushed alloy sample showing the peaks from two measurements (an up chirp and a down chirp) from the same target surface.

FIG. 2B is a plot 250 of range measurement data of a brushed alloy sample. Sample lateral motion begins after the 28th data point. Circles and pluses represent range measurements using either down or up chirps. Square data points represent range measurements that combine data from the up and down chirps resulting in speckle-compensated measurements.

Measurement Method

To solve the problem noted above, the disclosed embodiments teach how the use of two simultaneous distance measurements with different phase sensitivities on the surface distance can mitigate the speckle and other phase noise effects. In some embodiments of the invention, the different phase sensitivities are achieved by chirping the two lasers at different chirp rates. Even though both lasers are used to measure a single distance, for one chirp rate, the phase of the received signal evolves at one rate in time, while for the second chirp, the phase of the received signal evolves at a different rate in time. Conversely, it is important to note that the phase noise caused by speckle is common-mode for the two measurements, and can therefore be removed while maintaining the distance information. The measurement setup shown in FIG. 1A allows a single detector and single digitizer to acquire the sample surface distance information from both lasers simultaneously because $\kappa$, and therefore $f_{beat}$, is different for the two lasers. The different range peak frequencies for the two measurements, shown in FIG. 2A, highlight how the two measurements exhibit different optical phase-sensitivity to the sample surface distance. The '+' points in FIG. 2B represent the range measurement results from the first chirp rate, the 'o' points represent the same for the second chirp rate, and the black square points are the speckle-compensated results from combining the phase information from the first and second chirps, as described below. It is clear from closer inspection of the data that the '+' and 'o' data are anti-correlated. The algorithm described below capitalizes on this anti-correlation to compensate the speckle-induced phase noise.

Figure 3:
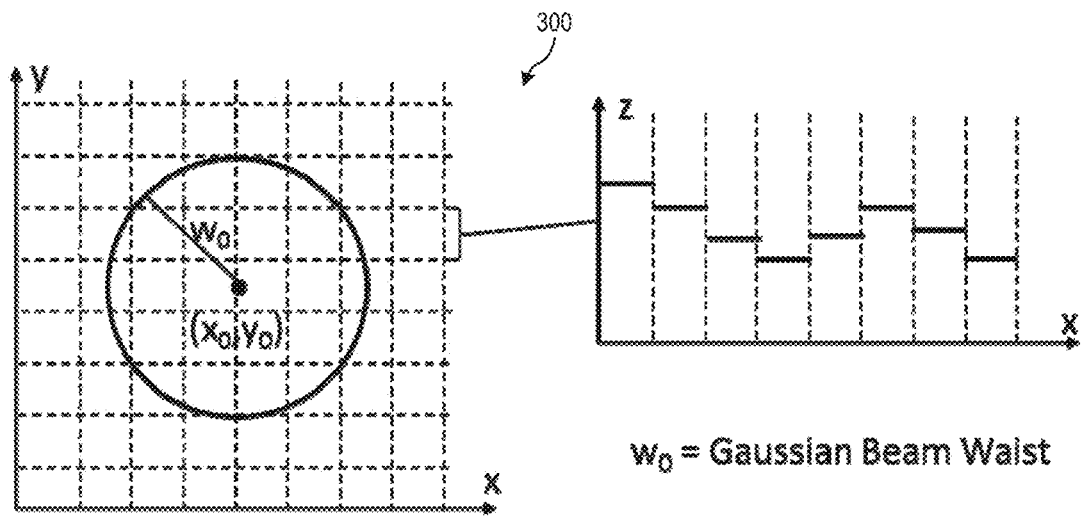
FIG. 3 is a plot of a discretized sample plane with Gaussian measurement beam according to disclosed embodiments.

The following is a mathematical description for speckle phase error compensation of FMCW laser radar measurements from a diffuse target with surface roughness $\sigma_z$, where $\sigma_z \ll \Delta R$, and $\Delta R = c/2B$ is the distance measurement resolution. The mathematical model relies on discretizing the sample plane into a uniform grid of j cells, and assigning a random height $z_j$ to each grid cell as shown in FIG. 3. For simplicity, we will let $n=n_g=1$ in following description.

FIG. 3 is a plot 300 of discretized sample plane with Gaussian measurement beam according to disclosed embodiments.

The measured FMCW distance signal is a sum of the returns from each grid cell in the sample plane, $$S(t) = \sum_j e^{[-((x_j-x_0)^2+(y_j+y_0)^2)/2w_0^2]} e^{[\frac{4\pi i}{c} z_j(v_0+\kappa t)]}, \quad (7)$$

where $\kappa$ is the laser chirp rate, $v_0$ is the laser start frequency, and $z_j$ is the distance to the $j^{th}$ grid cell. One can express equation (7) in polar form as, $$S(t) = A(t) e^{[\frac{4\pi i}{c} z_0(v_0+\kappa t)+\Theta(t)]}, \quad (8)$$

where $$z_0 = \frac{1}{N}\sum_j z_j,$$

and Θ(t) and A(t) are defined by equation (7). (See, P. Pavlicek, et. al. "Theoretical measurement uncertainty of white-light interferometry on rough surfaces," Appl. Opt. 42, 1809-1813 (2003).) Due to the small surface roughness, and in the limit that the measurement bandwidth is small compared to the laser frequency $v_0$, the phase and amplitude functions can be approximated by first order Taylor expansions: $\Theta(t) \approx \Theta_0 + \Theta_1 t$, and $A(t) \approx A_0 + A_1 t$. In this regime, the range errors due to speckle take the form, $\delta z = c/2\pi\kappa\Theta_1 - z_0$. Equations (7) and (8) were developed to describe the complicated behavior of the amplitude and phase of coherent distance measurements from diffuse surfaces. References Baumann and Pavlicek both describe the degradation of their respective measurements due to speckle from diffuse surfaces, but offer no solutions for compensating the measured phase errors. In the following paragraphs we will describe how to use two FMCW laser radar measurements with different sensitivities of the phase to the sample distance to compensate speckle-induced phase errors.

FIG. 4A is a plot 400 showing frequency versus time for first and second lasers according to disclosed embodiments.

FIG. 4B is a plot 430 showing phase versus time for a stationary sample. In this case the phase with and without speckle noise are nearly identical according to disclosed embodiments.

FIG. 4C is a plot 470 showing phase versus time of the measured signals for a sample with lateral motion. $\varphi_{1,0}$ and $\varphi_{2,0}$ represent the phase without speckle-induced phase noise, while $\varphi_1$ and $\varphi_2$ represent the measured phase with speckle-induced noise according to disclosed embodiments.

FIGS. 4A-C illustrate conceptually the behavior of speckle-induced phase errors for a two-laser FMCW distance measurement in scenarios with stationary and laterally moving samples. FIG. 4A shows the frequency chirp for both lasers. FIG. 4B shows the phase versus time for each FMCW range measurement for a stationary sample. In this case the time evolution of the speckle phase Θ(t) is entirely due to the time-rate-of-change of the laser frequency. For typical values of the chirp bandwidth (B>100 GHz) and surface roughness (<30 μm) the measured speckle-induced range noise due to the time-rate-of change of the laser frequency is small, on the order of the surface roughness. FIG. 4C shows the phase versus time for each FMCW range measurement when the sample is moving laterally. If the sample surface were specular (i.e. without speckle noise) the measured phase would evolve linearly with a slope that is proportional to the sample range as represented by $\varphi_{1,0}$ and $\varphi_{2,0}$, and there would be no error in the distance measurement. When the sample surface is diffuse the speckle phase ($\Theta_1$ and $\Theta_2$) evolves rapidly due to the changing position of the surface features relative to the measurement beam leading to large changes in the interference between returns from the individual grid cells shown in the left side of FIG. 3.

Without compensation, these phase excursions can result in range errors that are on the order of the distance measurement resolution ΔR=c/2B.

This case can be described by equation (8), with first order Taylor expansions of the phase and amplitude functions, for time intervals where the phase fluctuations Θ are approximately linear. The entire measurement duration is then modeled by combining many sequential regions defined by first-order Taylor expansions in Θ and A. If the two lasers are sufficiently close in wavelength, and the surface roughness is sufficiently small, the speckle phases for the two measurements are approximately equal at every point in time [$\Theta_1(t) \approx \Theta_2(t)$]. The condition for measuring correlated speckle phase with lasers 1 and 2 is provided in equation (9).

$$\frac{2\pi|\lambda_2 - \lambda_1|}{\left(\frac{\lambda_2 + \lambda_1}{2}\right)^2} \sigma_z \ll 1. \tag{9}$$

Finally, the phases from the two separate measurements may be combined to form a "compensated phase" whose range may depend only on the average distance to the sample $z_0$, and the two laser chirp rates. A linear fit of the compensated phase may then be performed to extract the phase slope (e.g. the angular frequency) of the compensated range peak from which the distance measurement may be calculated. These steps are shown mathematically in equations (10) and (11).

$$\phi_{comp} = \tag{10}$$
$$\phi_2(t) - \phi_1(t) = \frac{4\pi z_0}{c}(v_2 + \kappa_2 t) + \Theta_2(t) - \frac{4\pi z_0}{c}(v_1 + \kappa_1 t) - \Theta_1(t).$$

$$z_m = \frac{(\text{phase slope})c}{4\pi}\left(\frac{1}{\kappa_2 - \kappa_1}\right). \tag{11}$$

Chirped Sideband FMCW

Figure 5B:
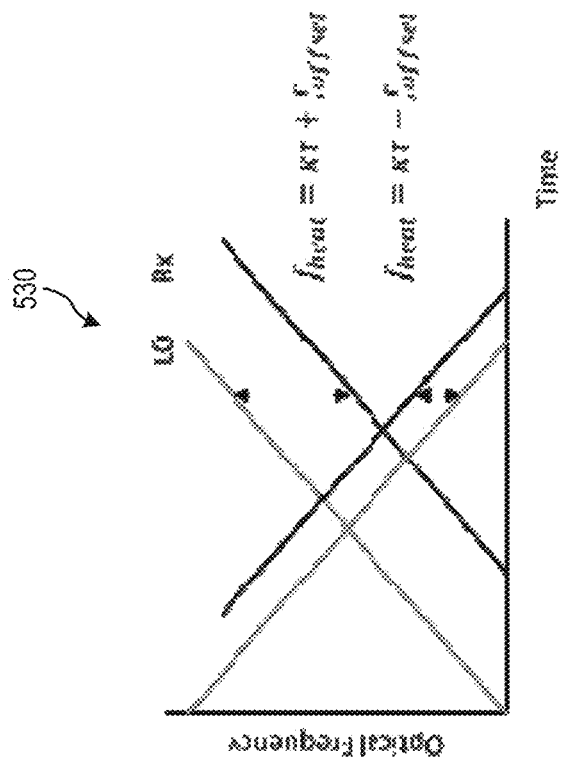
FIG. 5B is a plot showing an example of simultaneous measurement of up and down chirps with frequency offset showing that $f_{beat}$ is the different for the up and down chirps according to disclosed embodiments.
Figure 5A:
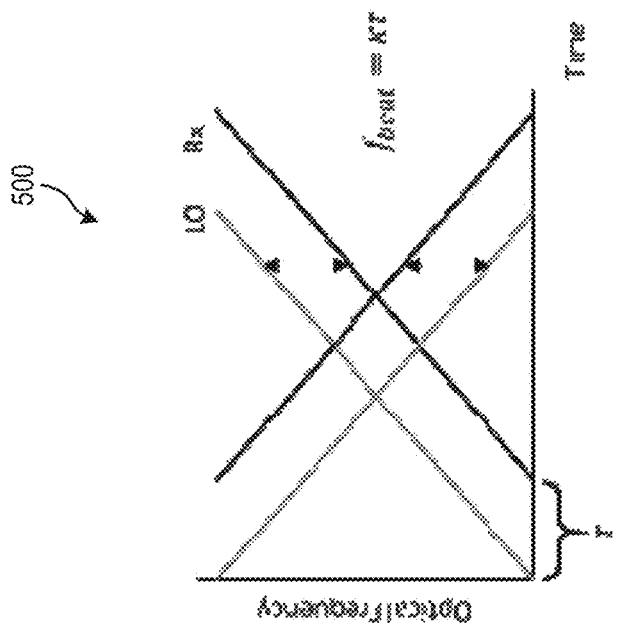
FIG. 5A is a plot showing an example of simultaneous measurement of up and down chirps without frequency offset showing that $f_{beat}$ is the same for the up and down chirps according to disclosed embodiments.

FIG. 5A is a plot 500 showing an example of simultaneous measurement of up and down chirps without frequency offset showing that $f_{beat}$ is the same for the up and down chirps according to disclosed embodiments.

FIG. 5B is a plot 530 showing an example of simultaneous measurement of up and down chirps with frequency offset showing that $f_{beat}$ is the different for the up and down chirps according to disclosed embodiments.

Figure 5C:
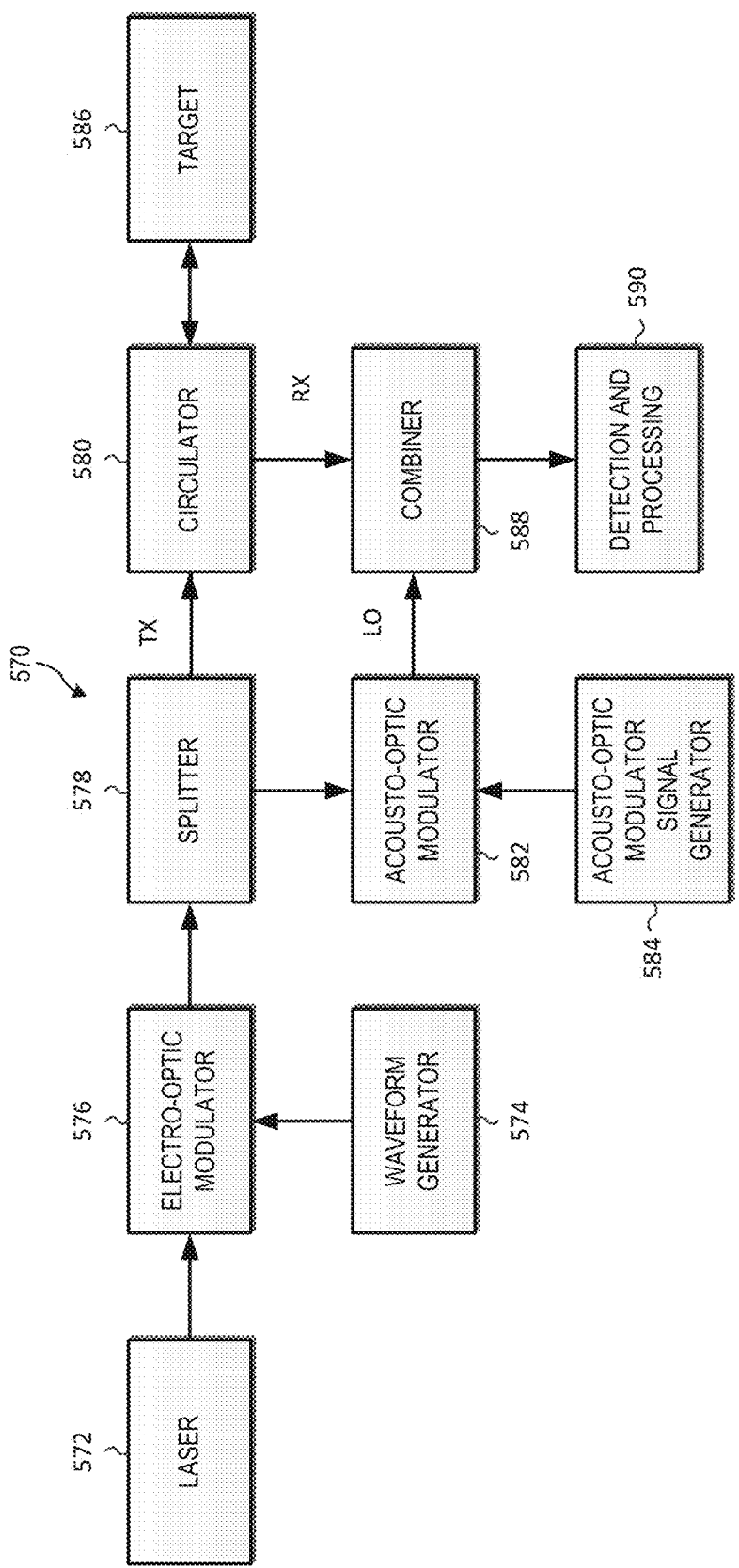
FIG. 5C is a simplified block diagram showing components in a chirped sideband modulation setup. An AOM is used to shift the LO (or Tx) off DC and thereby isolate speckle information from range information according to disclosed embodiments.

FIG. 5C is a simplified block diagram showing components in a chirped sideband modulation setup 570. An AOM is used to shift the LO (or Tx) off DC and thereby isolate speckle information from range information according to disclosed embodiments.

As shown in FIG. 5C, the chirped sideband modulation set up 570 includes a laser 572, a waveform generator 574, an electro-optic modulator 576, a splitter 578, a circulator 580, an acousto-optic modulator 582, an acousto-optical modulator signal generator 584, a target 586, a combiner 588, and a detection and processing unit 590.

In some embodiments of the invention, the optical phase-sensitive measurements may be performed using the FMCW ladar technique, and where the waveforms used may include frequency-chirped sideband modulation (i.e. homodyne rather than heterodyne) following U.S. Pat. No. 7,742,152 "Coherent Detection Scheme for FM Chirped Laser Radar". U.S. Pat. No. 7,742,152 is incorporated herein by reference in its entirety. In U.S. Pat. No. 7,742,152, the authors describe a "signal fading" problem that hinders the measurements during motion. We have determined that this signal fading is a result of the fact that, while two phase-sensitive measurements are present, the two measurements cannot be easily distinguished. This is because the two phase-sensitive measurements utilize sideband chirps with opposite signs (i.e. one is increasing in frequency and one is decreasing in frequency), but the same chirp rate magnitude. In this case, the "up" and "down" frequency chirps are measured at common or similar RF frequencies because the measurements are performed symmetrically about DC. As shown in FIG. 5A, $f_{beat}$ is the same for both the up and down frequencies. When using the same detector, the signals received from the up and down chirps can therefore interfere, resulting in "signal fading". As a result, the demonstrated measurements can suffer from phase-noise errors during surface (or beam) movement.

To separate and utilize the two phase-sensitive measurements, the disclosed embodiment shows that by shifting the measurement off of DC, the up and down chirps can be made to not share similar RF frequencies and the measurements can be made without signal fading because they don't interfere with one another.

FIG. 5A discloses an embodiment to accomplish the shifting of the measurement off of DC. Light from a laser 572 is directed through an electro-optic modulator 576 that produces chirped sidebands on the optical carrier frequency of the laser. The electro-optic modulator 576 is driven by a waveform generator 574. The modulated light is received by a splitter 578, which outputs a local oscillator (LO) and a transmitted (Tx) portion. The Tx portion is directed through an optical circulator 580 to a target 586. Light returning (Rx) from the target is redirected and received by a beam combiner 588. The LO portion is directed through an acousto-optic modulator 582 to allow separation of the contributions from the up-chirped and down-chirped sidebands. The acousto-optic modulator is driven by an acousto-optic modulator signal generator. The frequency-shifted LO is also received by the beam combiner. Output from the beam combiner is directed to a detection and processing unit 590.

In FIG. 5B, we show the result of shifting the Tx beam with an optical modulator. In this case, $f_{beat}$ is shown to be different for the up and down chirps. A simplified example chirped sideband modulation embodiment is shown in FIG. 5C that has been used to solve the signal fading problem and suppress phase noise-induced distance measurement errors. The figure shows the use of an acousto-optic modulator (AOM) in the LO path to enable the separation of the up and down chirp information. In the example shown one may use the RF frequencies below $f_{offset}$ to detect the down chirp signals and above $f_{offset}$ to detect the up chirp signals. Once the up and down chirps are separated, the suppression of phase noise-induced distance measurement errors follows analogously as for the carrier chirp case described in the previous section. Again, the different chirp rates (one positive and one negative in this case) provide the different optical phase sensitivities for suppression of the phase noise-induced distance measurement errors.

Measurement Filtering

The non-specular reflectivity of diffuse surfaces introduces the possibility for multipath interference in FMCW measurements of rough surfaces. Multipath interference refers to secondary reflections or scattering of the measurement beam between two or more surface features that may ultimately scatter back into the receiver. Multipath interference may cause time-varying phase shifts that result in errors in FMCW range measurements. These errors may become more pronounced when the sample undergoes lateral motion due to the rapid phase evolution of the interfering reflections. Specifically, large range errors may be observed in cases where the separation between the contributing surface features is sufficiently large that the inequality expressed in equation (9) is no longer valid. In such cases, the speckle-induced phase may not be well compensated by the measurement approach described in the previous section, and the resulting FMCW range measurement can exhibit errors on the order of the FMCW range resolution. FMCW measurements made on several types of rough surfaces indicate that the locations where multipath interferences occur, the spatial frequency of these effects, and the magnitude of the measurement errors may have the following properties: Their locations and magnitudes may be repeatable; the spatial frequency and magnitude of the errors are dependent on the material type; and the statistics of resulting range errors may not be Gaussian. Measurements of Lambertian scattering materials may exhibit more frequent and larger magnitude range errors while measurements of pseudo-diffuse materials, those that appear diffuse at low observance angles but reflective at high observance angles, yield less frequent and smaller magnitude range errors. Examples of range errors due to multipath interference are shown in FIG. 6A for ground glass and FIG. 6B for a paper business card.

Figure 6A:
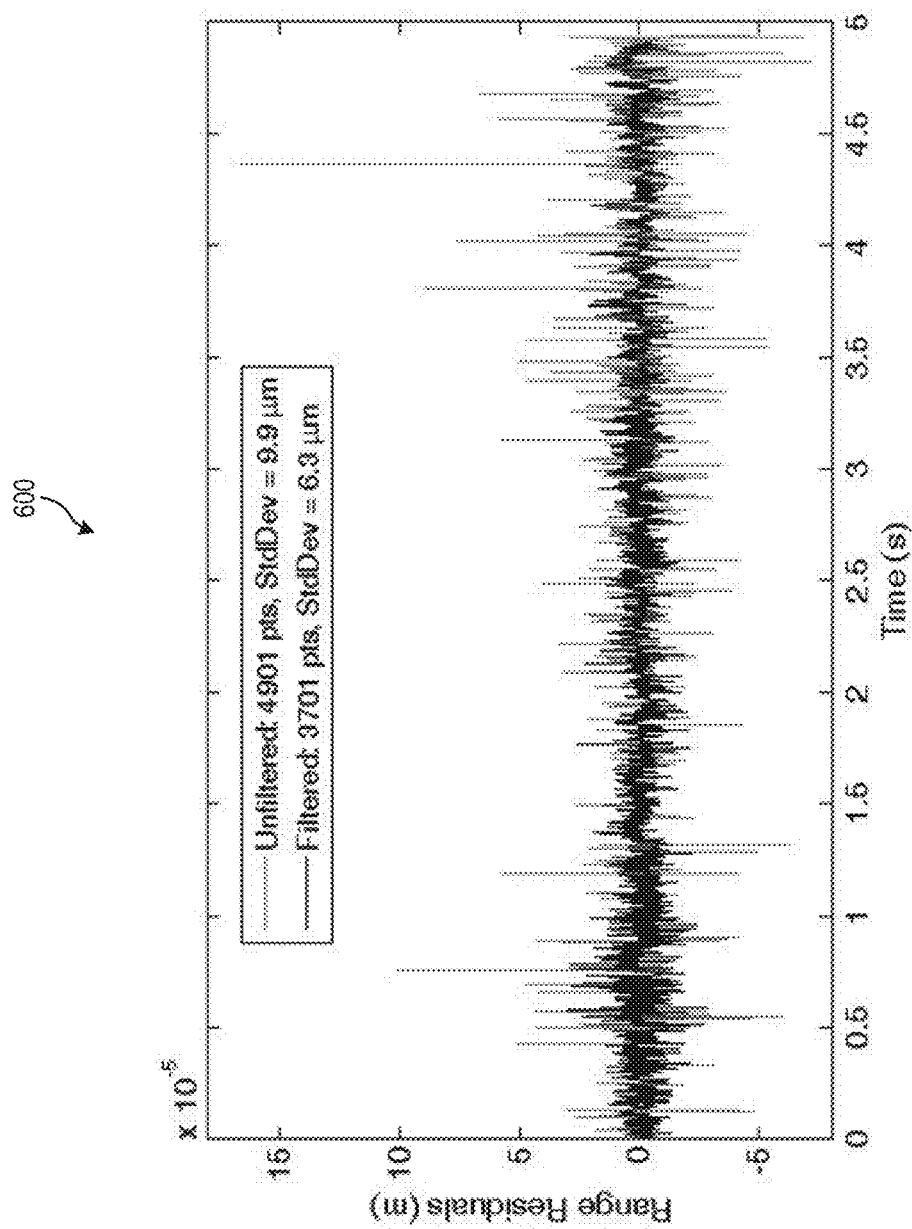
FIG. 6A is a plot showing filtered (black) and unfiltered (gray) FMCW range errors for two different surfaces undergoing lateral motion of 50 mm/s with respect to the measurement beam. 4901 measurements from a ~2 μm surface roughness piece of ground glass according to disclosed embodiments.

FIG. 6A is a plot 600 showing filtered (black) and unfiltered (gray) FMCW range errors for two different surfaces undergoing lateral motion of 50 mm/s with respect to the measurement beam according to disclosed embodiments. 4901 measurements from a ~2 μm surface roughness piece of ground glass. The filter threshold is set to reject ~25% of the measurements. The filtered data set (black) contains 9 points with range errors exceeding 25 μm while the unfiltered set (gray) contains 121 points with range errors exceeding 25 μm.

Figure 6B:
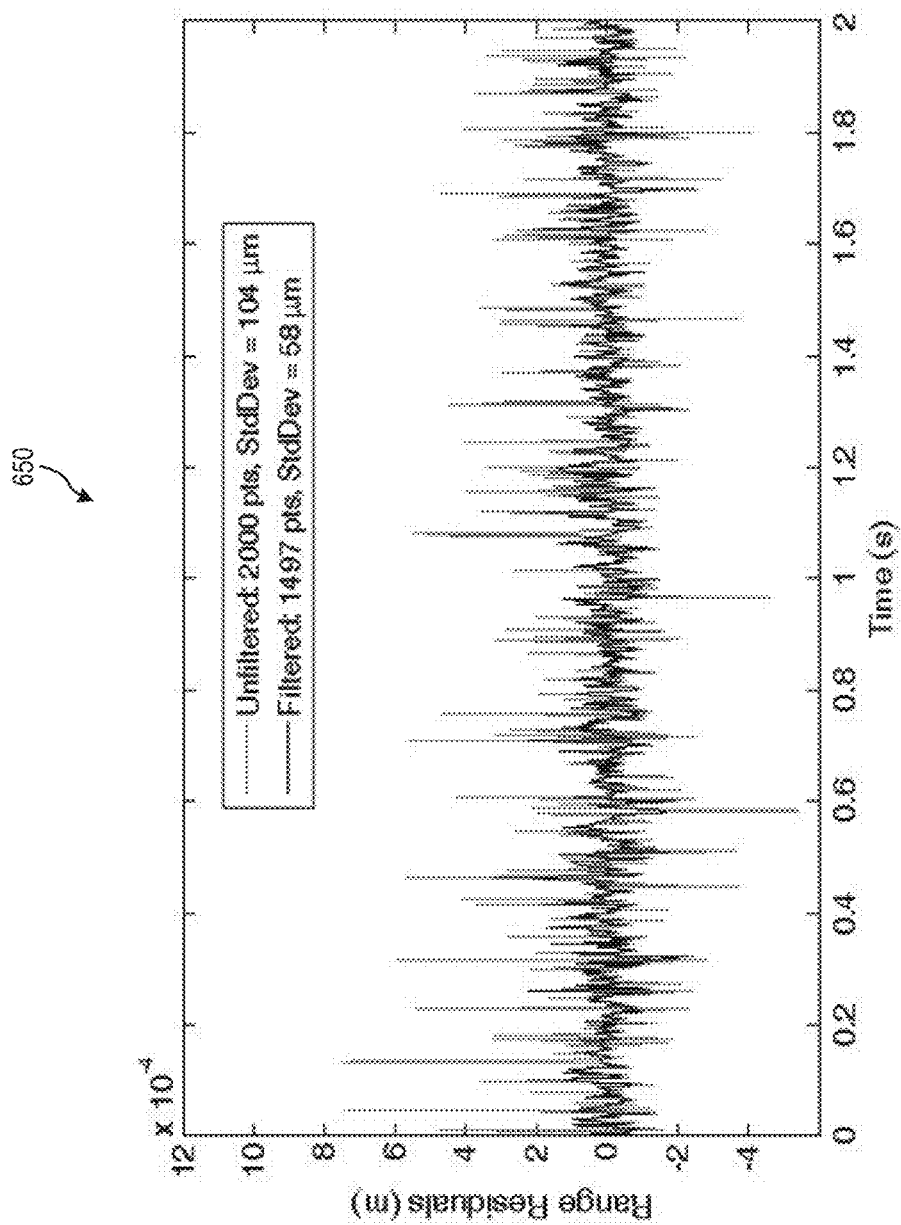
FIG. 6B is a plot showing filtered (black) and unfiltered (gray) FMCW range errors for two different surfaces undergoing lateral motion of 50 mm/s with respect to the measurement beam. 2000 measurements from a business card with ~25 μm surface roughness according to disclosed embodiments.

FIG. 6B is a plot 650 showing filtered (black) and unfiltered (gray) FMCW range errors for two different surfaces undergoing lateral motion of 50 mm/s with respect to the measurement beam according to disclosed embodiments. 2000 measurements from a business card with ~25 μm surface roughness. The filtered data set (black) contains 2 points with range errors exceeding 250 μm while the unfiltered set (gray) contains 71 points with range errors exceeding 250 μm. The difference in the frequency and magnitude of the range errors between the two materials is due to the fact that ground glass is pseudo-diffuse while the business card is a Lambertian scatterer.

Fortunately, measurements that exhibit large range errors due to multipath interference contain signatures that may allow for detection of the errors. Once detected the errors may either be weighted or removed from the data set.

The disclosed embodiments teach two filtering methods to detect measurements containing large range errors. Both methods rely on the idea that peaks containing interference from multiple unresolved surface features may often be deformed as a result of the multi-surface interference, compared to an ideal single specular reflection. One embodiment uses peak shape analysis to detect misshapen peaks. In this embodiment, the FMCW range peak may first be fit with a Gaussian or other appropriate function. Next, the root-mean-squared error (RMSE) between the measured peak and the fit function may be computed. Finally, the RMSE is compared against a threshold value to identify peaks containing large range errors. In situations where multiple range measurements are averaged, the threshold value may be computed based on the statistics of the RMSE values for the set of points being averaged. In single-point measurement scenarios the threshold may be computed in the same way as for averaged measurements using the assumption that the average peak SNR changes slowly compared to the measurement rate.

Figure 7:
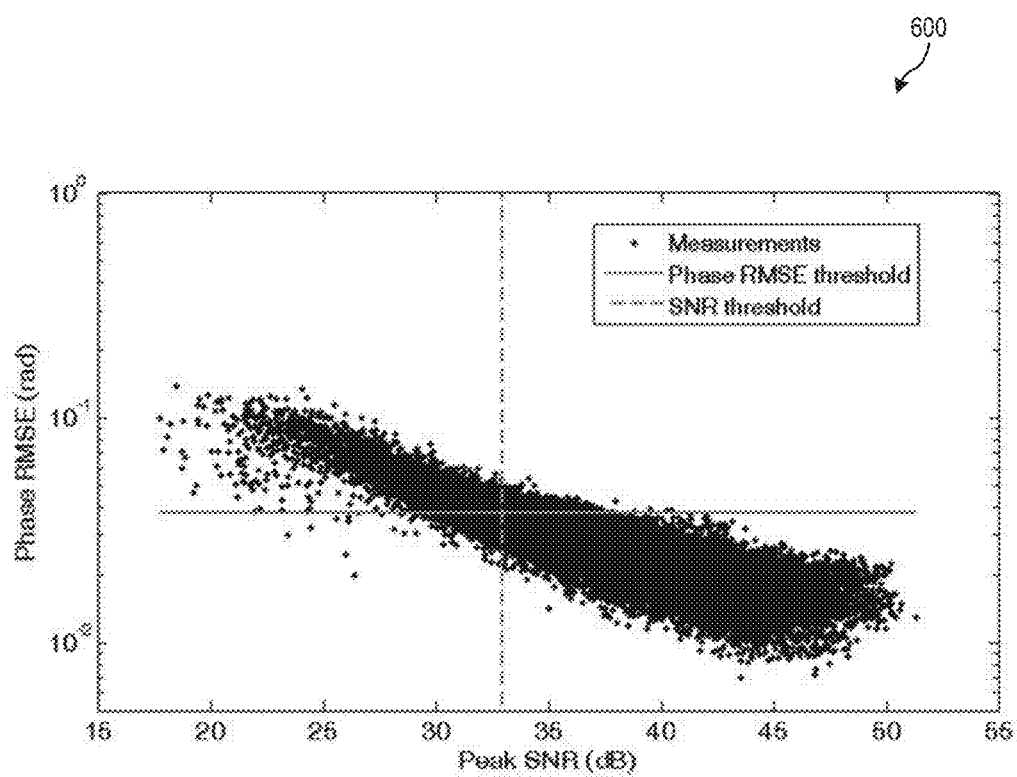
FIG. 7 is a plot showing an example of threshold settings for the phase RMSE and peak SNR filter according to disclosed embodiments.

FIG. 7 is a plot 700 showing an example of threshold settings for the phase RMSE and peak SNR filter according to disclosed embodiments.

The second embodiment for filtering compares the range peak SNR and the RMSE of the signal phase to detect misshapen range peaks. This embodiment was used to filter both data sets shown in FIG. 6, and its implementation is illustrated in FIG. 7. For this embodiment, the SNR of the range peak may first be computed. Next, the instantaneous phase of the signal may be computed as a function of time.

If the measured signal is real-valued, this step may be carried out using a Hilbert Transform to derive the complex-valued representation. The instantaneous phase may then be computed from the complex-valued signal using the tangent function. The phase is unwrapped yielding a phase versus time curve that is approximately linear. The phase curve may then be fit with a low-order polynomial, and the RMSE between the fit line and the measured values may be computed. Finally, peaks containing large range errors may be identified by comparing the measured peak SNR and phase RMSE against threshold values, as shown in FIG. 7.

The data sets in FIG. 6 demonstrate the benefits of this type of filtering. In each case the number of outlier measurements is reduced by more than a factor of 10, and the standard deviation of each data set is reduced by nearly a factor of 2. During initial testing both filtering methods achieved similar performance, and the preferred approach (or combination of approaches) may depend on the specific measurement scenario and the details of the signal processing work flow.

Dispersion Compensation of FMCW Measurements

In measurement scenarios where the target, the beam delivery optics, or the optical medium between the reference surface and sample surface has dispersion the $\frac{1}{2}(\alpha-\alpha')t^2$ term in equation (5) may become significant, and the dispersion may require compensation to produce accurate distance measurements. Fortunately, compensation of such measurements can be achieved by averaging an up-chirp and down-chirp measurement that cover roughly the same spectral region, and have approximately the same, but opposite sign, chirp rate. In practice this can be accomplished by averaging temporally sequential up and down chirps from the same chirped laser source. This technique will be illustrated by considering a measurement where the reference surface and the sample surface are separated by 0.5 m of SMF-28 fiber. The dispersion coefficient for SMF-28 is $\beta_2 = -0.022$ ps$^2$/m, and the group velocity is $v_g = c/1.4682$ at 1550 nm. For this example the measurement duration will be 200 µs, and the chirp rate will be 600 MHz/µs. At the end of the measurement ($t_c = 200$ µs) the up-chirp (e.g. $\alpha_u > 0$) will have accumulated an FMCW phase of $\varphi_u = \alpha_u \beta_1 z t_c + \frac{1}{2}(\alpha_u - \alpha'_u) t_c^2$. The accumulated phase for each term in $\varphi_u$ is given by $\alpha_u \beta_1 z t_c = 3669.4$ rad, and $\frac{1}{2}(\alpha_u - \alpha'_u) t_c^2 = 0.0063$ rad. That $\frac{1}{2}(\alpha_u - \alpha'_u) t_c^2 > 0$ reflects the fact that $\alpha_u > \alpha'_u$ for the up-chirp. For the down-chirp the accumulated FMCW phase at the end of the measurement follows the same relation, $\varphi_d = \alpha_d \beta_1 z t_c + \frac{1}{2}(\alpha_d - \alpha'_d) t_c^2$. However, for the down-chirp $\alpha_d \beta_1 z t_c = -3669.4$ rad, whereas $\frac{1}{2}(\alpha_d - \alpha'_d) t_c^2 = 0.0063$ rad. We can now use equation (11) to calculate the distance between the reference and sample surfaces. Due to the dispersion phase term the up-chirp measurement appears too long by ~2 ppm, and the down-chirp measurement appears too short by ~2 ppm. However, the averaged distance measurement, $$z = \frac{(\varphi_u - \varphi_d) v_g}{2 t_c (\alpha_u - \alpha_d)} = 0.5 \text{ m},$$

provides the correct answer.

Figure 8:
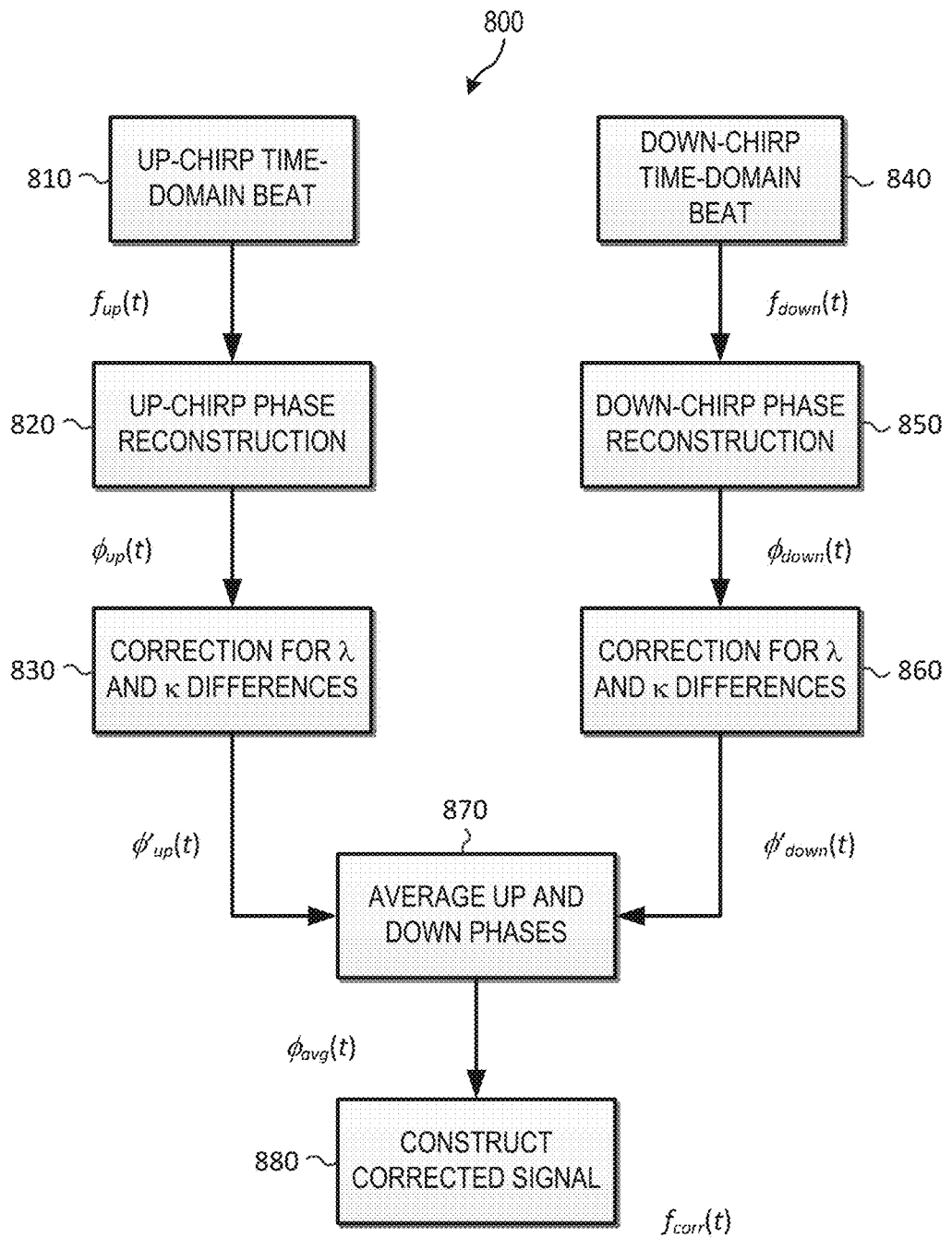
FIG. 8 is a block diagram showing components used in one embodiment to compensate for Doppler and speckle phase noise.

Using Phase Reconstruction to Compensate Phase Noise-induced Distance Measurement Errors As described in previous sections, compensation of phase-noise-induced distance measurement errors due to speckle for coherent ladar measurements may be important for obtaining accurate and precise measurements of dynamic and diffuse targets. In this section, we demonstrate an effective method for accomplishing the processing involved with this compensation using phase reconstruction, as shown in FIG. 8. For one embodiment of this invention, we may simultaneously acquire heterodyne beat signals resulting from a sample surface using two different chirp rates. As an exemplary case, an up-chirp and a down-chirp, as represented by the functions $f_{up}(t)$ and $f_{dn}(t)$, are assumed for the following discussion. We may transform these heterodyne beat signals to recover/reconstruct the signal phases as functions of time during the measurement, as represented by $\phi_{up}(t)$ and $\phi_{dn}(t)$. This may be accomplished using methods such as a Hilbert Transform. If the center wavelength or chirp rate is different for the up and down chirps, then one may apply scaling and offset corrections to account for the differences, as represented by $\phi'_{up}(t)$ and $\phi'_{dn}(t)$. One may then average the corrected up-chirp and down-chirp phases as functions of time to suppress the phase noise, as represented by $\phi_{avg}(t)$. If desired, the noise-suppressed time domain oscillating heterodyne beat function may be reconstructed from knowledge of the noise-suppressed phase as a function of time, as represented by $f_{cor}(t)$.

FIG. 8 is a block diagram showing components used in a processing chain 800 to compensate for Doppler and speckle phase noise according to disclosed embodiments.

As shown in FIG. 8, the processing chain 800 includes an up-chirp time-domain beat determination element 810, an up-chirp phase reconstruction element 820, an element for correction of the up-chirp for $\lambda$ and $\kappa$ differences 830, a down-chirp time-domain beat determination element 840, a down-chirp phase reconstruction element 850, an element for correction of the down-chirp for $\lambda$ and $\kappa$ differences 860, an averaging element 870 for averaging up and down phases, and a construction element 880 for constructing a corrected signal. These various elements 810-880 could be implemented as electrical circuits or digital processing.

The up-chirp time-domain beat determination element 810 is configured to determine an up-chirp time-domain beat $f_{up}(t)$.

The up-chirp phase reconstruction element 820 is configured to reconstruct an up-chirp phase $\phi_{up}(t)$ based on the up-chirp time-domain beat $f_{up}(t)$.

The element for correction of the up-chirp for $\lambda$ and $\kappa$ differences 830 is configured to correct the up-chirp phase reconstruction $\phi_{up}(t)$ based on $\lambda$ and $\kappa$ differences to generate a corrected up-chirp phase reconstruction $\phi'_{up}(t)$.

The down-chirp time-domain beat determination element 840 is configured to determine a down-chirp time-domain beat $f_{down}(t)$ The down-chirp phase reconstruction element 850 is configured to reconstruct a down-chirp phase $\phi_{down}(t)$ based on the down-chirp time-domain beat $f_{down}(t)$.

The element for correction of the down-chirp for $\lambda$ and $\kappa$ differences 860 is configured to correct the down-chirp phase reconstruction $\phi_{down}(t)$ based on $\lambda$ and $\kappa$ differences to generate a corrected down-chirp phase reconstruction $\phi'_{down}(t)$.

The averaging element 870 is configured to average the corrected up-chirp phase reconstruction $\phi'_{up}(t)$ and the corrected down-chirp phase reconstruction $\phi'_{down}(t)$ to generate an average phase reconstruction $\phi_{avg}(t)$.

The construction element 880 is configured to construct a corrected signal $f_{corr}(t)$ based on the average phase reconstruction $\phi_{avg}(t)$.

What is claimed is:

1. A method for determining a distance to least a portion of a diffusely scattering object, comprising:

generating a first laser output;
generating a second laser output, wherein
at least one of the first laser output or the second laser output comprises a modulation sideband;
chirping an optical frequency of at least one of the first laser output or the second laser output to generate a first output beam and a second output beam;
generating a first local oscillator beam that exhibits a chirp waveform of the first output beam;
generating a second local oscillator beam that exhibits a chirp waveform of the second output beam;
directing at least a portion of the first output beam and a portion of the second output beam to at least a portion of a diffusely scattering object at least in part during motion of the diffusely scattering object relative to the portion of the first output beam, the portion of the second output beam, or both output beams;
receiving a scattered portion of the first output beam from the diffusely scattering object to form a first received beam;
receiving a scattered portion of the second output beam from the diffusely scattering object to form a second received beam;
directing at least a portion of the first received beam and at least a portion of the first local oscillator beam onto an optical detector to produce a first interference signal;
directing at least a portion of the second received beam and at least a portion of the second local oscillator beam onto the optical detector or a different optical detector to produce a second interference signal; and
processing the first interference signal and the second interference signal to determine a distance to at least a portion of the diffusely scattering object.

2. The method of claim 1, further comprising:
generating the first laser output and the second laser output at a same laser source.

3. The method of claim 1, further comprising:
using an optical modulator to generate the one or more modulation sidebands.

4. The method of claim 1, wherein said motion comprises lateral motion, axial motion, or a combination thereof.

5. The method of claim 1, wherein
said directing at least a portion of the first output beam and a portion of the second output beam to at least a portion of a diffusely scattering object is performed using a beam scanning device or a beam steering device.

6. A method for determining a distance to at least a portion of an object, comprising:
generating a first laser output;
generating a second laser output, wherein
the first and second laser outputs may be derived from the same laser source or from different laser sources;
chirping, for a chirp duration, an optical frequency of at least one of the first laser output or the second laser output to generate a first output beam and a second output beam;
generating a first local oscillator beam that exhibits a chirp waveform of the first output beam;
generating a second local oscillator beam that exhibits a chirp waveform of the second output beam;
directing at least a portion of the first output beam and a portion of the second output beam to at least a portion of an object;
receiving a scattered or reflected portion of the first output beam from the object to form a first received beam;
receiving a scattered or reflected portion of the second output beam from the object to form a second received beam;
directing at least a portion of the first received beam and at least a portion of the first local oscillator beam onto an optical detector to produce a first interference signal;
directing at least a portion of the second received beam and at least a portion of the second local oscillator beam onto the optical detector, or a different optical detector, to produce a second interference signal;
calculating a first signal phase, over the chirp duration, as a function of time based on the first interference signal;
calculating a second signal phase, over the chirp duration, as a function of time based on the second interference signal;
using the first signal phase based on the first interference signal and the second signal phase based on the second interference signal to determine a distance to at least a portion of the object.

7. The method of claim 6, further comprising:
calculating said first signal phase or said second signal phase based on implementation of a Hilbert transform or other transform to produce a complex-valued representation of the first interference signal or the second interference signal.

8. The method of claim 6, further comprising:
calculating said first signal phase or said second signal phase based on a phase of a complex-valued representation of the first interference signal or the second interference signal.

9. The method of claim 6, wherein
said using the first signal phase and the second signal phase to determine a distance to at least the portion of the object comprises determining a sum or a difference of the first signal phase and the second signal phase.

10. The method of claim 6, wherein
said using the first signal phase and the second signal phase to determine a distance to at least the portion of the object comprises performing corrections to at least one of the first signal phase or the second signal phase, or a combination of the first and second signal phases, based on an optical wavelength, an optical frequency, or a chirp rate of at least one of the first output beam or the second output beam.

11. The method of claim 6, wherein said using the first signal phase and the second signal phase to determine a distance to at least the portion of the object comprises performing a linear fit to a signal phase including at least the first signal phase and the second signal phase.

12. The method of claim 6, further comprising:
modulating, at an optical modulator, at least one of the first or second laser outputs to generate a modulation sideband.

13. A method comprising:
generating a first laser output;
generating a second laser output, wherein
the first and second laser outputs may be derived from the same laser source or from different laser sources;
chirping an optical frequency of at least one of the first laser output or the second laser output to generate a first output beam and a second output beam;
generating a first local oscillator beam that exhibits a chirp waveform of the first output beam;
generating a second local oscillator beam that exhibits a chirp waveform of the second output beam;

directing at least a portion of the first output beam and a portion of the second output beam to at least a portion of a diffusely scattering object;

receiving a scattered or reflected portion of the first output beam from the diffusely scattering object to form a first received beam;

receiving a scattered or reflected portion of the second output beam from the diffusely scattering object to form a second received beam;

directing at least a portion of the first received beam and at least a portion of the first local oscillator beam onto an optical detector to produce a first interference signal;

directing at least a portion of the second received beam and at least a portion of the second local oscillator beam onto the optical detector or a different optical detector to produce a second interference signal; and weighting or filtering a range peak, a signal phase, or an interference signal based on one or more metrics comprising a shape of a range peak, a shape of a signal phase, or a shape of an interference signal.

14. The method of claim 13, further comprising calculating a Fourier transform of the first interference signal or the second interference signal to generate one or more range peaks; or calculating a Hilbert transform or other transform to generate a complex-valued representation of the first interference signal or the second interference signal for generation of one or more signal phases.

15. The method of claim 13, wherein the one or more metrics is based at least on a reference shape of a range peak, a reference shape of a signal phase, a reference shape of an interference signal, a signal-to noise ratio of a range peak, a signal-to noise ratio of a signal phase, or a signal-to noise ratio of an interference signal.

16. The method of claim 13, wherein the directing of at least the portion of the first output beam and the portion of the second output beam comprises directing at least the portion of the first output beam and directing the portion of the second output beam to at least the portion of the diffusely scattering object at least in part during motion of the diffusely scattering object relative to the portion of the first output beam, the portion of the second output beam, or both output beams.

17. The method of claim 13, wherein said one or more metrics comprise a root-mean-square deviation of a shape of a range peak, a shape of a signal phase, or a shape of an interference signal as compared to a reference or calculated shape of a range peak, a reference or calculated shape of a signal phase, or a reference or calculated shape of an interference signal, respectively.

18. The method of claim 13, further comprising:

utilizing at least one of the one or more metrics to correct a value of a distance measurement.

19. The method of claim 13, further comprising:

utilizing at least one of the one or more metrics to quantify a confidence in a distance measurement.

20. The method of claim 6, further comprising:

selecting a first center wavelength for the first laser output; and selecting the second center wavelength such that a dispersion imparted on the second laser output is the same as a dispersion imparted on the first laser output.

21. The method of claim 6, wherein using the first signal phase of the first interference signal and the second signal phase of the second interference signal to determine the distance to at least the portion of the object comprises:

combining the first signal phase and the second signal phase to form a compensated phase; and extracting a phase slope from the compensated phase to determine the distance to at least the portion of the object.

* * * * *